DATA COMPARISON SYSTEM UTILIZING A UNIVERSAL CHARACTER

Filed April 12, 1961 6 Sheets-Sheet 1

INVENTORS
GILBERT W. KING
WARREN B. STROHM

BY Joe L. Koerber
ATTORNEY

FIG. 2a (1) $\alpha_1\ \alpha_2\ A_1\ A_2\ A_3\ A_4\ \tau\ F_1\ F_2\ F_3\ F_4\ F_5\ \alpha_1\ \alpha_2\ A'_1\ A'_2\ A'_3\ \tau\ F'_1\ F'_2\ F'_3\ F'_4\ \alpha_1\ \alpha_2$
(2) $A_1\ A_2\ A_3\ A_4\ A_5\ A_6\ A_7\ A_8\ A_9\ A_{10}\ A_{11}\ A_{12}\ A_{13}\ A_{14}\ A_{15}\ A_{16}$

FIG. 2b (1) $\alpha_1\ \alpha_2\ A_1\ A_2\ \nu\ \nu\ \tau\ F_1\ F_2\ F_3\ F_4\ F_5\ \alpha_1\ \alpha_2$
(2) $A_1\ A_2\ A_3\ A_4$

FIG. 2c (1) $\alpha_1\ \alpha_2\ A_1\ A_2\ A_3\ A_4\ \tau\ n\ \delta\ F_1\ F_2\ F_3\ F_4\ F_5\ \alpha_1\ \alpha_2$
(2) $A_1\ A_2\ A_3\ A_4$

FIG. 2d (1) $\alpha_1\ \alpha_2\ A_1\ A_2\ A_3\ A_4\ \tau\ F_1\ F_2\ F_3\ F_4\ F_5\ \alpha_1\ \alpha_2$
(2) $A_1\ A_2\ A_3\ A_4\ \#\ A_5\ A_6\ A_7\ A_8$

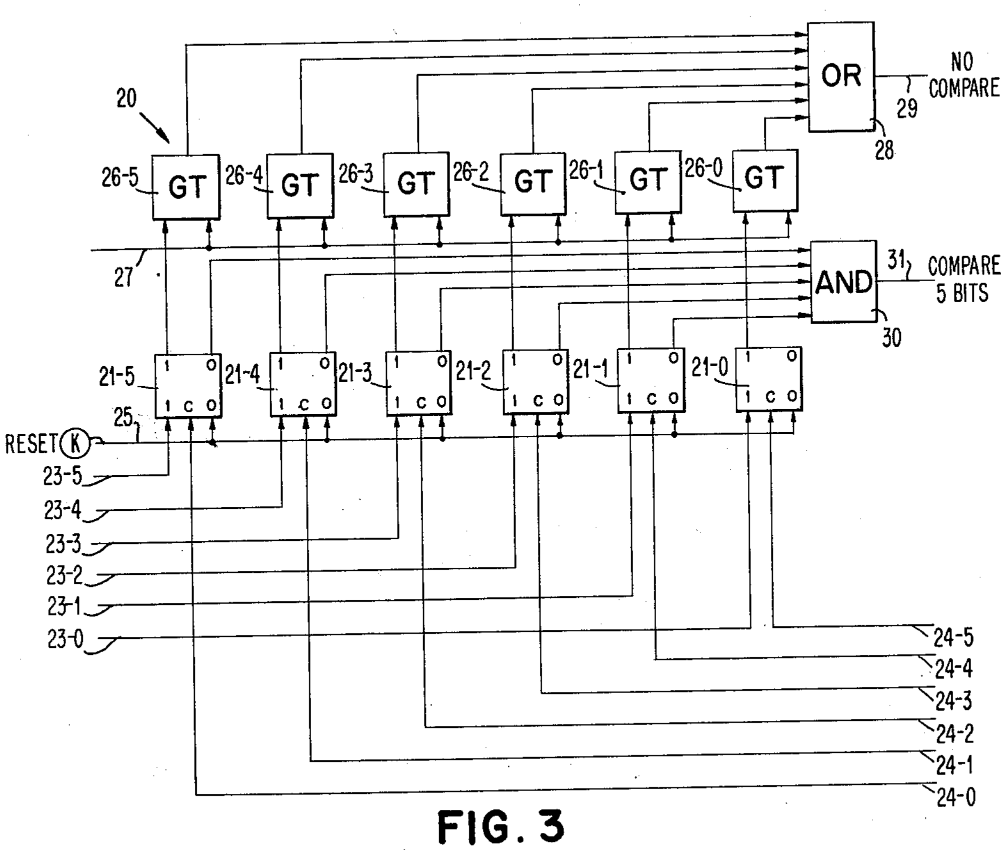

FIG. 3

DATA COMPARISON SYSTEM UTILIZING A UNIVERSAL CHARACTER

Filed April 12, 1961 6 Sheets-Sheet 3

DATA COMPARISON SYSTEM UTILIZING A UNIVERSAL CHARACTER

Filed April 12, 1961

DATA COMPARISON SYSTEM UTILIZING A UNIVERSAL CHARACTER

Filed April 12, 1961 6 Sheets-Sheet 6

United States Patent Office 3,167,740
Patented Jan. 26, 1965

3,167,740
DATA COMPARISON SYSTEM UTILIZING A UNIVERSAL CHARACTER

Gilbert W. King, Briarcliff Manor, and Warren B. Strohm, Hopewell Junction, N.Y., assignors to International Business Machines Corporation, New York, N.Y., a corporation of New York Filed Apr. 12, 1961, Ser. No. 102,487
9 Claims. (Cl. 340—146.2)

Figure 1:
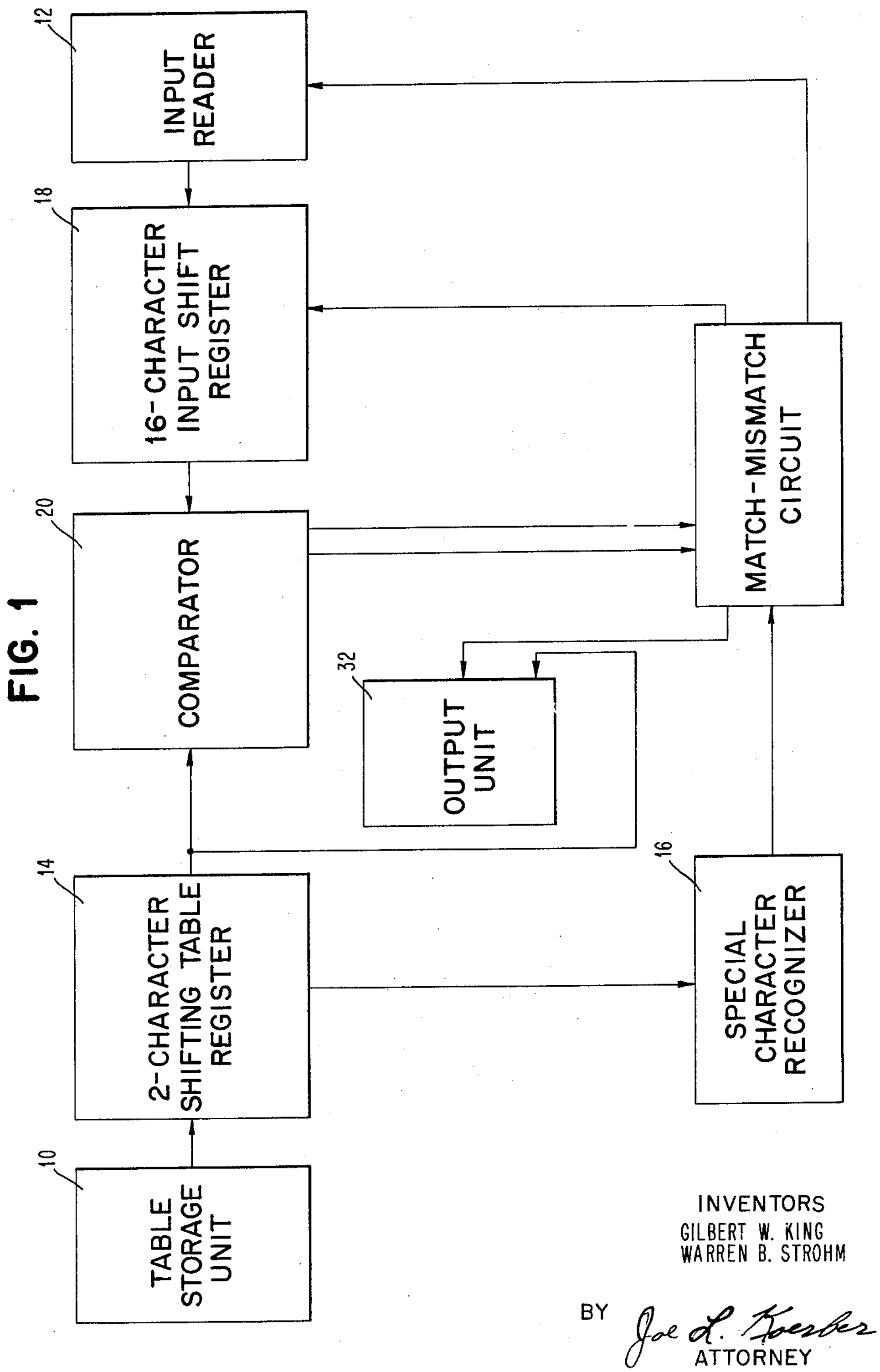

This invention relates to a data comparing device of the table look-up type wherein input data are compared with address data in the table and other data associated with the address are read out to an output device when a match is made. The invention more particularly is directed to a masking operation in such a system wherein selected character positions in the table data are coded to compare with any input character.

It is a well known expedient to utilize a masking technique to mask certain portions of data so as to simulate a matching condition with other data where such a condition does not actually exist. However, known embodiments of this technique do not permit sufficient flexibility for many purposes.

In a system such as that disclosed hereinafter, the known techniques are not suitable due to the variable length addresses and the fact that the character or characters to be masked not only may vary in number but also in the positions which they occupy in different addresses.

Accordingly, it is a primary object of the present invention to provide apparatus for masking one or more character positions of an address wherein the masking control instruction is included in the particular address data.

A further object of this invention is to provide an improved data masking device for use in comparison of data.

Another object of this invention is to provide apparatus for reading coded data positioned in data positions to be masked and for inhibiting mismatch indications.

The foregoing and other objects, features and advantages of the invention will be apparent from the following more particular description of a preferred embodiment of the invention, as illustrated in the accompanying drawings.

In the drawings:

FIGURE 1 is a general block diagram representing the system.

FIGURE 2*a* is a representation of the format of table data and input data.

FIGURE 2*b* is the format of table data including the masking instructions $\nu$.

FIGURE 2*c* is the format of table data including the shift control instructions $n\delta$.

FIGURE 2*d* is the format of table data for an automatic space operation.

FIGURE 3 is a schematic representation of a comparator circuit.

Figures 4, 4A:
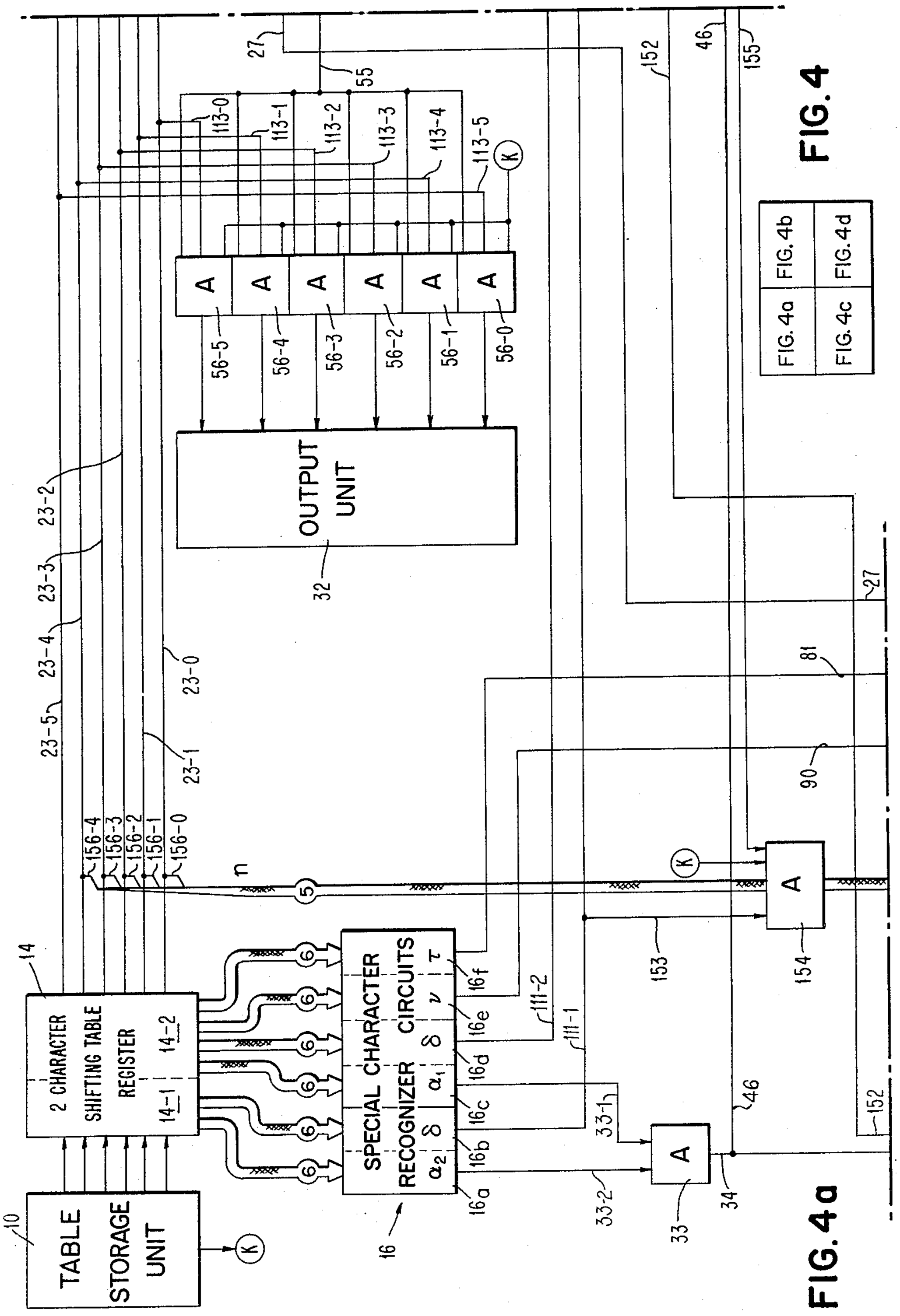
Figure 4B:
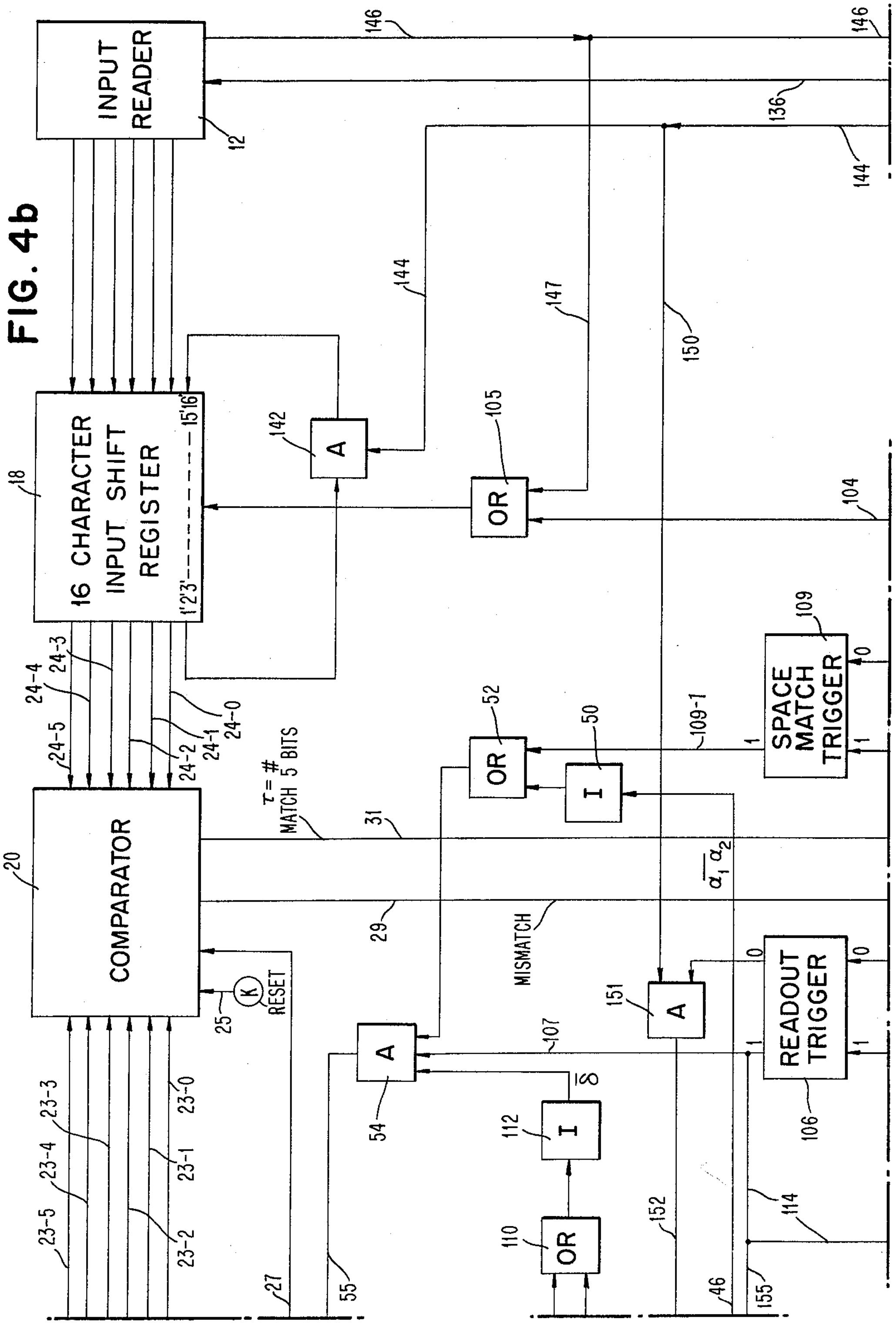

FIGURE 4 indicates the arrangement of FIGURES 4*a*–4*d* to make a composite schematic of the circuit.

FIGURES 4*a*–4*d* when taken together form a circuit schematic.

*General description*

Referring to FIGURE 1, a table store unit 10 is provided which stores a number of tags or addresses (hereinafter referred to as addresses) which are to be compared with input data from an input reader 12. Each address in the table store unit 10 has associated therewith other data which are to be read out when a favorable comparison between input data and a table address is detected. The data in the table store unit 10 are shifted character-by-character through a two character shifting table register 14 which is divided into register sections 14–1 and 14–2 (FIG. 4*a*). A character is first shifted into register 14–1 and then to register 14–2 after which it is shifted out and lost.

The table store unit 10 may be any suitable storage medium, for example, magnetic tape, magnetic drum, paper tape, or photographic film. In the embodiment described herein, the table data are binary coded 6-bit characters which are recorded in the table storage unit 10 and are read out serial-by-character and parallel-by-bit and are shifted into the two character shifting table register unit 14.

Each section of the register unit 14 may be a conventional shift register consisting of 6 flip-flops adapted to receive and shift character data in parallel.

The input reader 12 may be any data reader capable of reading binary coded characters serial-by-character and parallel-by-bit, capable of generating a shift signal with the reading of each character and of stopping after any of such signals.

Devices of the type required for units 10, 12 and 14 are well known in the art and therefore are not shown or described in detail.

A character recognition circuit 16 consists of sections **16*a*–16*f*. The sections 16*a* and 16*b* are associated with register section 14–1, and sections 16*c*–16*f* are associated with register section 14–2. Each section 16 is adapted to recognize a particular special character when the character is in the asociated register 14. The section 16*a* recognizes the character alpha$_2$ ($\alpha_2$); section 16*b* recognizes the character delta ($\delta$); section 16*c* recognizes the character alpha$_1$ ($\alpha_1$); section 16*d* recognizes the character delta ($\delta$); section 16*e* recognizes the character nu ($\nu$); and section 16*f*** recognizes the character tau ($\tau$). The codes for these characters and a space representing character # are as follows:

| | | | | | | |
|---|---|---|---|---|---|---|
| $\alpha_1$ | 0 | 1 | 1 | 1 | 1 | 1 |
| $\alpha_2$ | 1 | 1 | 1 | 1 | 1 | 1 |
| $\delta$ | 1 | 0 | 0 | 1 | 1 | 1 |
| $\nu$ | 0 | 0 | 0 | 0 | 0 | 1 |
| $\tau$ | 0 | 1 | 1 | 1 | 1 | 0 |
| # | 0 | 1 | 1 | 1 | 1 | 1 |

It is noted that the codes for # and $\alpha_1$, are identical. The importance of this identity will be pointed out in connection with an automatic space operation.

The coding of characters in this embodiment is actually an octal or modified binary code but is referred to herein simply as a binary code. For example, $\alpha_1$ has an octal value of 37 which is represented by the binary 3 code (011) followed by the binary 7 code (111). The composite character representation therefore is 011111.

Each of the recognizer circuits is an AND gate to which the binary outputs of the corresponding register 14 are applied in accordance with the character codes.

An input shift register 18 having a capacity of sixteen 6-bit characters is associated with the input reader 12 to receive character inputs therefrom. The register 18 is divided into sixteen character registers designated from left to right as 18–1 through 18–16. This register 18 may be of the same general type as the character register 14 except that it is a closed ring and a character in the register 18–1 may be shifted around to the register 18–16. A shift input signal causes simultaneous shifting of each character one position to the left and shifting of the character in position 18–1 to position 18–16. As data are shifted through the register 14–2, the contents of that register are compared in a comparator unit 20 with the character then in the register 18–1. The comparator 20 is adapted to have an output potential representative of a mismatch condition when the character in the register 14–2 and the character in the register 18–1 do not match.

Figure 4C:
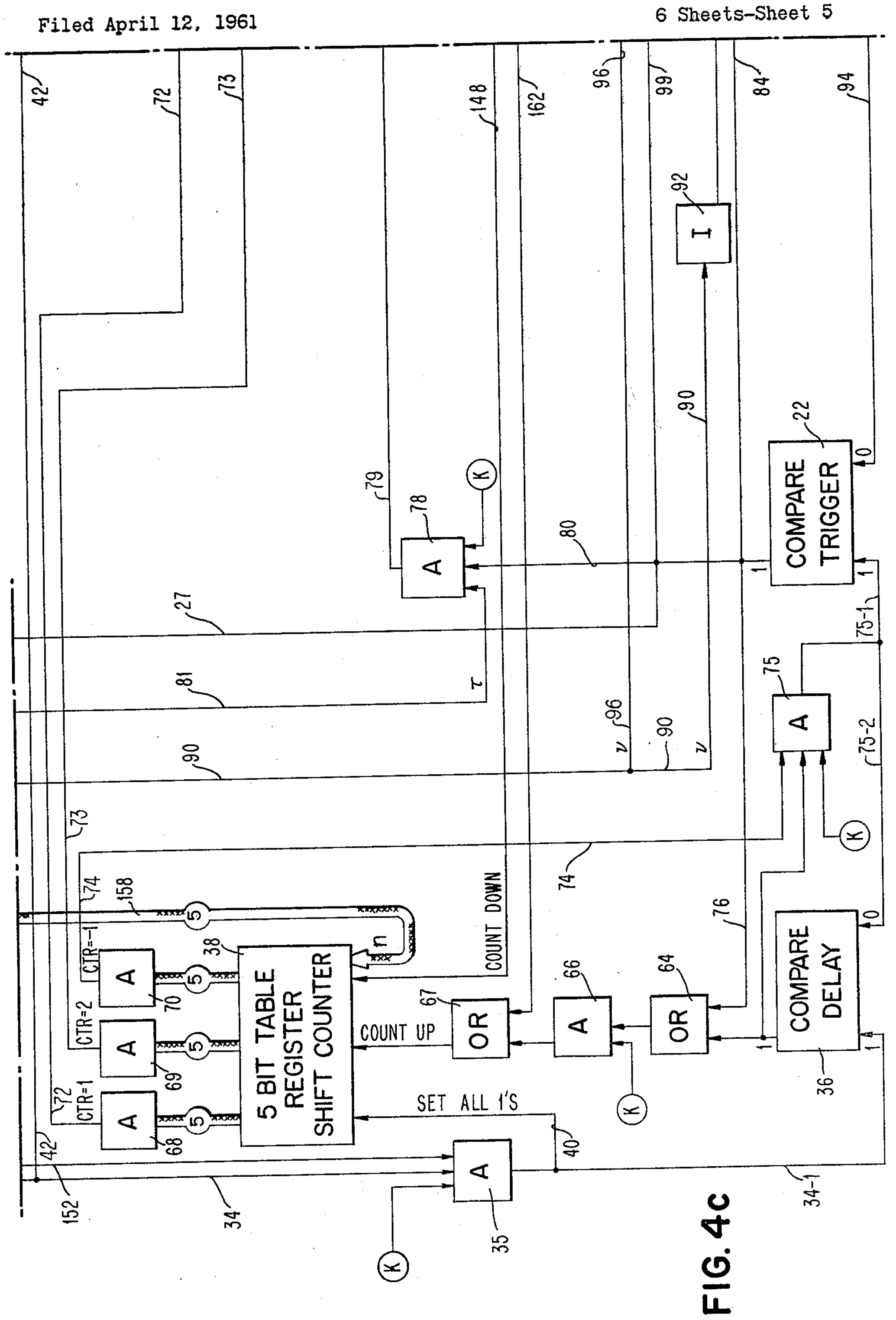
Figure 4D:
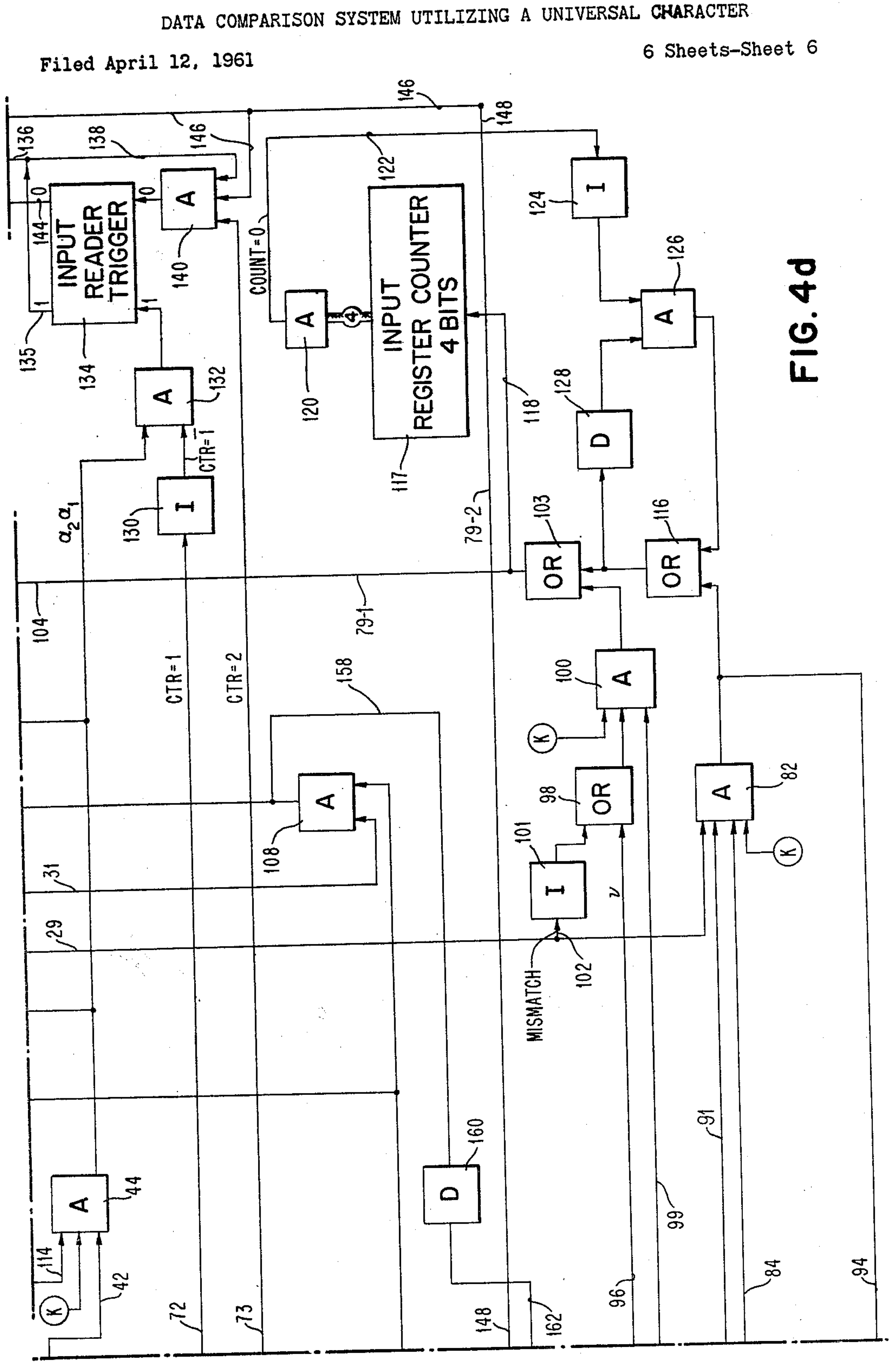

Negative logic is utilized in this circuit which means that when a signal or condition is not present, the particular line is at a potential of 0 volt whereas, when the condition does exist, the line is at a potential of −3.5 volts. It is noted that, in general, outputs in the described circuits, except certain clock pulses, are 0 and −3.5 volt direct current (D.C.) levels. For example, the comparator output following a mismatch condition is −3.5 volts whereas the comparator output following a match condition is 0 volt. The D.C. levels are gated through various logical elements by short duration clock pulses. When a match condition is detected between input data from the reader 12 and address data from the table unit 10, the data associated with the matched address is to be read out to the output unit 32 under control of a match-mismatch circuit which includes, a compare trigger 22 (FIG. 4*c*). The comparator 20 also is adapted to indicate when the five high order bits of a particular 6-bit character match.

*Comparator*

Referring to FIGURE 3 a block schematic of the comparator 20 is illustrated. The comparator consists of 6 flip-flops 21–0 through 21–5 having their binary 1 input terminals connected to input lines 23–0 to 23–5 corresponding to 6-bits of a first input character and having their complement terminals C connected to input lines 24–0 to 24–5 corresponding to the 6 bits of a second input character. The 0 inputs of the flip-flops 21 are common connected to a reset line 25. Reset pulses may be clock pulses, K, described hereinafter. The binary 1 outputs of the flip-flops 21 are connected to 6 gate units 26–0 to 26–5. A gate line 27 is common connected to all the gates 26. This gate line may be connected to the binary 1 output of a compare trigger described hereinafter. The outputs of the gates 26 comprise the 6 inputs to an OR circuit 28 having a single output line 29. The binary 0 outputs of the 5 high order flip-flops 21 comprise the inputs to an AND gate 30 having a single output line 31.

Input signals to the binary 1 input terminals on lines 23 set the flip-flops 21 in accordance with a particular character. Thereafter, input signals representative of a second character applied to the complement terminals C of flip-flops 21 switch all flip-flops to their complement states. If the first input character and the second input character are identical, then all flip-flops are in their binary 0 state after the second character input. If one or more of the flip-flops remain in the binary 1 state due to a mismatch, the output of the corresponding gate 26 produces a −3.5 volt non-compare indicating output potential on the line 29. The normal 0 volt potential of the line 29, following a compare operation, indicates a match condition.

If the five high order bits of the two characters match, this condition is indicated by a −3.5 volt output on the line 31. In the absence of this match condition the potential of line 31 is 0 volt.

*Data format*

Referring to FIGURE 2*a*, the general format of data in the table unit 10 is illustrated, line 1, as well as the format of data which will appear in the input register 18, line 2. In line 1 of FIGURE 2*a* the characters $A_1A_2A_3A_4$ represent the address information. Each address is preceded by the symbols $\alpha_1\alpha_2$. The symbols $F_1F_2F_3F_4F_5$ represent the data associated with the preceding address. The associated data are followed by the symbols $\alpha_1$ and $\alpha_2$ which also indicate the beginning of the next address $A_1'A_2'A_3'$ etc. The symbol $\tau$ is used to indicate the end of the address data and the beginning of the associated data. Line 2 of FIGURE 2*a* represents input data such as would appear in the 16 positions of input register unit 18. This latter data are compared character-by-character with the address data to obtain a match therebetween. In the illustrated example, the first four characters of the input data shown in line 2 match the four character address shown in line 1. When this matching condition is detected followed by the detection of the symbol $\tau$, the following associated data $F_1F_2F_3F_4F_5$ are read out.

FIGURE 2*b* illustrates a table storage format somewhat altered from that of FIGURE 2*a*. In this illustration, the address is represented by characters $A_1A_2\nu\nu$. The symbol $\nu$ may be described as a universal character which is inserted in the address to cause a match indication for any input data. For example, data in register 18 consisting of characters $A_1$ and $A_2$ followed by any other two characters, regardless of what these latter two characters are, is indicated as matching the address $A_1A_2\nu\nu$.

FIGURE 2*c* illustrates another variation in the format of table data. The address $A_1A_2A_3A_4$ is followed by $\tau$ which is followed by the symbols $n\delta$. The letter $n$ represents a numeric character such as 4 or 6. In the table data a number rather than the character $n$ will appear. The character $\delta$ is used in conjunction with the number $n$ and is an instruction to substitute the number $n$ for a number in a counter and to operate in accordance with the substituted number in shifting input register unit 18.

FIGURE 2*d* shows a normal format wherein the line 1 represents a table entry consisting of the symbols $\alpha_1$ and $\alpha_2$ followed by some word represented by characters $A_1A_2A_3A_4$ followed by the symbol $\tau$ and a word, perhaps in another language, corresponding to the address. The input data in register 18 is represented on line 2 by one word corresponding to the address and represented by characters $A_1A_2A_3A_4$. This first word is followed by a space which is represented by the illustrated symbol (#) which is followed by a second word $A_5A_6A_7A_8$.

A normal operation is to compare the input data with the table address and to read out the corresponding word $F_1$–$F_5$ when such a match is made. It is then normally necessary to obtain a match on the space symbol # with a corresponding space address in the table. This entails a separate operation and requires that the space symbol be recorded as an address in the table data or that words be stored in the table both with and without a following space symbol. The circuits described hereinafter operate to compare the five high order bits of the symbol $\tau$ with the five high order bits of a space symbol # and to effect an automatic space operation where such a comparison is effected.

Recognizer circuits 16*a* and 16*b* are provided to recognize when the character $\alpha_2$ or $\delta$ is in the register 14–1. Recognizer circuits 16*c*–16*f* are provided to recognize when the character $\alpha_1,\delta,\nu$ or $\tau$ is in the register 14–2.

It will be apparent that the embodiment described herein is particularly adapted to a translation operation where, for example the addresses and input data $A_1$, $A_2$, etc. may be in one language and the associated date $F_1$, $F_2$, etc. in the table store unit may be in another language. In such an operation the input data are matched with the corresponding table data and the corresponding words in the other language are read out to the output device. However, it is not the inventors' intention to limit the invention to language translation since the disclosed functions may be utilized in other data processing operations such as associative memory and table look-up operations.

Another particular application of this masking technique is the processing of part numbers consisting of two or more fields each of which identifies a particular characteristic or feature of the part. For example, a first field of three digits may identify the type of part such as a motor, a sealed beam light or a chemical solution. A second field may identify the manufacturer. Other fields may identify, in the case of an electric motor, the voltage, horsepower, type of winding, etc.

Such a number may have the form 432–202–110–2–12. If it is desired to operate upon all part numbers which identify a motor (432) manufactured by Acme Corp. (202), an entry 432–202–$\nu\nu\nu$–$\nu$–$\nu\nu$ in the table will provide a match indication of all part numbers designated 432–202 followed by three fields of three, one and two digits respectively, where the identity of the specific digits in the latter three fields is immaterial.

When the character recognition circuits 16a and 16c coincidentally recognize their contents as $\alpha_2$ and $\alpha_1$ respectively, the comparator circuit 20 is enabled to begin comparison of data in the register 18–1 and data in register 14–2 after two character shifts in the register during which $\alpha_1$ and $\alpha_2$ are shifted out and two following characters are shifted in. Data passes continually through register 14–2 and, as long as match conditions are indicated, new data are shifted through the register 18–1. The comparison continues as long as a mismatch in the comparator does not occur and until the character $\tau$ is recognized in the register 14–2. The recognition of $\tau$ following the matching of all characters after $\alpha_1$, $\alpha_2$ indicates that the next following data should be transmitted to an output unit 32.

When the character $\nu$ is in the register 14–2, a mismatch is indicated but the mismatch indicating circuit is disabled whereby a match between $\nu$ and the character in the register 18–1 is simulated and the comparison of successive characters continues as though there had been an actual match rather than a simulated match.

*Circuit description*

Referring to FIGURES *4a–4d*, assume that the character input shift register 18 has been filled by data from the input reader 12. Assume also that data from the table storage unit 10 is being shifted continually through the register 14. When the characters $\alpha_1$ and $\alpha_2$ are recognized by their respective character recognition circuit 16c and 16a, the outputs of these circuits are applied via lines 33–1 and 33–2 to an AND gate 33. The output of AND 33 is applied as one input via a line 34 to an AND gate 5. The output of AND 35 is gated by a clock pulse K, generated when the next character is read from the table unit 10, and is applied via a line 34–1 to the binary 1 input of a compare delay trigger 36, and to all binary 1 inputs of a table shift register counter 38 via a line 40, thereby setting the counter to all ones (−1). The counter 38 may be a conventional type 5-stage binary counter adapted to be set to all ones by signals on parallel input lines (FIG. *4d*), to any number by binary coded parallel inputs; and to count up by a third input and down by a fourth input. The output of the AND 33 also is branched from the line 34 to a line 42 through which it is applied to an AND gate 44, and also via a line 46 to an inverter 50 (FIG. *4b*). The output of inverter 50 is applied as one of two inputs to an OR gate 52. The output of the OR 52 is applied to an AND gate 54, the output of which is applied through a line 55 to 6 AND gates 56–0 through 56–5.

The character in the register 14–2 is manifested by coded potentials of 0 and −3.5 volts on lines 23–0 to 23–5 which comprise one input to the comparator 20. Similarly the character in the register 18–1 is manifested in the comparator by coded potentials of 0 and −3.5 volts on lines 24–0 to 24–5. When the two characters manifested in the comparator 20 match in all 6 bit positions, the potential of the output line 29 is 0 volt. If there is a mismatch between one or more bits of the two characters, the potential of the line 29 is changed to −3.5 volts.

When the characters $\alpha_1$ and $\alpha_2$ are in the registers 14–2 and 14–1, it is desired to delay the starting of comparison until these two characters have been shifted out and the next two characters have been shifted in. This is accomplished through the initial setting of the counter 38 to all 1's and the compare delay trigger 36 which is turned to the ON condition by the output of gates 33 and 35 effected by the sensing of $\alpha_1$, $\alpha_2$. The output of trigger 36 is applied to a two input OR gate 64, the output of which is applied to a two input AND gate 66. The second input to AND 66 is a clock pulse generated from the table store unit 10 at the start of each character. This clock pulse is designated K and is utilized as a gating signal in a number of subsequently described circuits. The clock signal is of short duration whereas the other signals in this circuit, as described hereinbefore, are D.C. levels. The output of AND 66 is applied through an OR gate 67 to the counter 38.

The binary outputs of counter 38 are applied to AND gates 68, 69 and 70. The output of AND 68 is 0 volt except when the counter 38 stands at 1, at which time, the output on a line 72 is −3.5 volts. The output of AND 69 is 0 volt except when the counter stands at a count of 2. The output of AND 70 is 0 volt except when the counter stands at −1 (all ones). When the counter stands at 2 a line 73 is at −3.5 volts. When the counter stands at −1, a line 74 is at −3.5 volts. The output signal on line 74 is applied to an AND gate 75. A second input to AND 75 is the binary 1 output of the compare delay trigger 36. A third input to AND 75 is the clock pulse K.

When the characters $\alpha_2$ and $\alpha_1$ are in registers 14–1 and 14–2 respectively, the output of AND 33 conditions AND 35. When $\alpha_2$ is shifted into register 14–2, the clock pulse K generated at that time gates a signal through AND 35 to set a count of all 1's (31 or −1) in counter 38 and also turns on the compare delay trigger 36. The clock pulse K generated when the character $A_1$ (the first character following $\alpha_2$) is shifted into register 14–2 gates a signal from compare delay trigger 36 and OR 64 through AND 66 to advance the counter 38 to a count of 0 (all 0's). The −1 count in counter 38 through line 74 had conditioned AND 75 whereby the clock pulse which changed the counter to a count of 0 also gated a signal through AND 75 and line 75–1 to turn the compare trigger 22 ON and through line 75–2 to turn the compare delay trigger 36 OFF. OR 64 is now conditioned via line 76 by the binary 1 output of compare trigger 22.

The clock pulse K generated when the character $A_2$ is shifted into register 14–2 gates a counting signal through AND 66 to advance the counter 38 to a count of 1. The clock pulse generated when the character $A_3$ is shifted into register 14–2 gates a signal through AND 66 to advance counter 38 to a count of 2. The output on lines 72 and 73 are ineffective at this time. The clock pulse generated when the character $A_4$ is shifted into register 14–2 gates a signal through AND 66 to advance the count in counter 38 to 3. The clock pulse generated when the character $\tau$ (following $A_4$) is shifted into register 14–2 gates a signal through AND 66 to advance the counter to a count of 4. The clock pulse generated when a first character $F_1$ (following $\tau$) is shifted into the register 14–2 gates a signal through AND 66 to advance the count to 5. When a 4 character word is matched in the manner just described the counter 38 stands at a count of 5. It is to be noted that the counter 38 will contain a count one more than the number of characters matched. The number in the counter 38 is required in order that, after a satisfactory matching and read out of the corresponding data, the correct number of new input characters may be shifted into the register 18 coincidently with the shifting out of the matched characters.

The binary 1 output of compare trigger 22 also is applied to an AND gate 78 via a line 80. AND 78 operates to initiate the read out of data $F_1$, $F_2$, etc. after a match of a complete entry has been detected. With AND 78 conditioned by the signal on line 80, indicating that a mismatch condition has not been detected and, with a $\tau$ recognition signal on a line 81, the clock pulse K generated when the character $F_1$ is shifted into register 14–2 also is gated through AND 78 to a line 79.

The binary 1 output of compare trigger 22 also is applied to an AND gate 82 via a line 84. The signal on the line 84 is one of three inputs which gate a mismatch signal on the line 29 to the binary 0 input of the compare trigger 22 to turn the trigger 22 OFF. A second gating input to the AND 82 is the inverted output of recognition circuit 16e on a line 90. The line 90 is at a potential of 0 volt at all times except when a character $\nu$ is in the register 14–2. The 0 potential on line 90 is inverted by inverter 92 and is applied as a −3.5 volt gating signal via line 91 to AND 82. A third input to the AND 82 is the clock pulse K. Thus it is apparent that with the compare trigger 22 ON, indicating the matching of all preceding characters of an entry, and with any character other than $\nu$ in the register 14–2, AND 82 is conditioned at the time of each clock pulse K to pass a mismatch signal on line 29. This mismatch signal applied to the binary 0 input of compare trigger 22 via a line 94 turns compare trigger 22 OFF and thereby inhibits the read out of data when the symbol $\tau$ is subsequently recognized.

The potential on line 90 also is applied via a line 96 to OR gate 98. When the character $\nu$ is in the register 14–2, the line 96 is at the −3.5 volt potential and this signal is passed by the OR 98 and AND 100 for a purpose described hereinafter. When $\nu$ is in the register 14–2, the −3.5 volt potential on line 90 is inverted by inverter 92 and is applied as a 0 volt blocking signal to the AND 82 thereby preventing the passage of a mismatch signal on line 29. This blocking is desired since, when the symbol $\nu$ is in the register 14–2 it is desired to indicate a matching condition with whatever character may at that time be in the register 18–1.

The binary 1 output of compare trigger 22 also is applied via a line 99 to an AND gate 100. AND 100 is a portion of the circuit adapted to effect an end around shift of the character in register 18–1 and to shift all other characters 1 position to the left whereby the next character which occupies the register 18–1 will be compared with the next character passing through the register 14–2. If the two characters match, the potential of the line 29 remains at 0 volt. The 0 volt potential is applied to an inverter 101 via a line 102 and appears at OR 98 as a −3.5 volt gating potential. Thus it is seen that, during a matching condition, the output of inverter 101 is gated through OR 98 and AND 100. During the mismatch condition, which is present when the character $\nu$ is in the register 14–2, the −3.5 volt potential on line 29 is inverted in inverter 101 and appears at OR 98 as a 0 volt potential which is not passed. However, during the mismatch condition, the −3.5 volt potential on lines 90 and 96 is gated through OR 98 to AND 100. Thus the next clock pulse K which is the third input to AND 100 gates the signal to OR 103, simulating a match condition. The output of OR 103 is applied through a line 104 and an OR gate 105 to register 18 to effect the one position shifting of characters in the register.

As described hereinbefore, the ON state of compare trigger 22 conditions AND 78 whereby, when the symbol $\tau$ is detected in register 14–2 and the resultant −3.5 volt potential on the line 81 is applied to AND 78, the clock pulse K, generated when the character $F_1$ following $\tau$ is shifted into register 14–2, produces an output from AND 78. The output of AND 78 is applied to the binary 1 input of a read out trigger 106 via line 79–1 and also to an AND gate 108 via line 79–2 which is in the binary 1 input circuit of a space match trigger 109. The binary 1 output of read out trigger 106 is applied via line 107 to AND 54. A second input to AND 54 is derived from recognition circuits 16b or 16d via lines 111–1 and 111–2 which recognize the presence of the character $\delta$ in the register 14–1 and 14–2 respectively. With the character $\delta$ in either register 14–1 or 14–2, an OR gate 110 applies an output to an inverter 112 which in turn applies its nongating output to AND 54.

The recognition circuit 16d thus prevents the character $\delta$ in register 14–2 from being read out to the output unit 32. The recognition circuit 16b prevents the number $n$ preceding the symbol $\delta$ from being read out. Utilization of the $\delta$ circuits is described in more detail hereinafter. The third input to AND 54, described hereinbefore, is the output of OR 52. OR 52 produces an output under one of two conditions. When $\alpha_1$ and $\alpha_2$ are not in the registers 14–1 and 14–2, the potential of lines 34 and 46 is 0 volt. This potential is inverted by inverter 50 and is applied as a −3.5 volt gating potential to OR 52. The purpose of this circuit is to prevent reading the symbol $\alpha_1$ to the read out unit 32. Since the presence of $\alpha_1$ and $\alpha_2$ in the register 14 produces a −3.5 volt output from AND 33 on lines 34 and 46, the inverted potential is 0 volt and is not passed by OR 52. The second input to OR 52 is the binary 1 output of the space match trigger 109 on line 109–1. This portion of the circuit is described hereinafter with reference to an automatic space operation.

Thus, with the read out trigger 106 ON and $\alpha_1$ and $\alpha_2$ not in the register 14, an output from AND 54 on line 55 is applied, in parallel, to the AND gates 56–0 through 56–5. This signal, in conjunction with the clock pulse K which also is applied to the AND gates 56, reads out the character then in the register 14–2 through read out lines 113–0 through 113–5 which also are connected to the AND gates 56 in accordance with their respective binary orders. The output of the AND gates 56 is applied to the output device 32 where the character then in the register 14–2 is printed or otherwise utilized. This read out continues serially until the entire associated data corresponding to the matched address is read out. After the data associated with a match address has been read out, the characters $\alpha_1$ and $\alpha_2$ following the associated data (FIG. 2) enter the registers 14–2 and 14–1 where they are recognized. The recognition of $\alpha_1$ and $\alpha_2$ occurs before the shifting of data from the input reader 12 is initiated and therefore the binary 0 output of the input reader trigger 134 applied via lines 144, 150, AND 151 and line 152 gates a signal through AND 35 to line 40 to set counter 38 to −1 (all 1's). The binary 1 output of read out trigger 106 in addition to being applied via line 107 to AND 54 is applied via a line 114 to AND 44 where it, in conjunction with the $\alpha_1$ and $\alpha_2$ signal on line 42, gates the next clock pulse through AND 44 to turn read out trigger 106 and space match trigger 109 OFF. The output of AND 44 then continues via AND 132 to turn an input reader trigger 134 ON.

*Mismatch condition*

Having described the operation during a matching condition, the operation will now be described wherein a mismatch condition is detected.

When a mismatch is indicated by the −3.5 volt output signal on the line 29, this mismatch signal is gated through AND 82 by the next following clock pulse K to turn the compare trigger 22 OFF and also is gated through an OR gate 116 to perform two functions. First it is applied to OR 103 to cause a one position shift of the characters in the input register 18 as well as an end around shift of the character in the register 18–1 to the register 18–16. Secondly, it operates a counter 117 and an associated ring circuit to continue the shifting operation whereby the 16 characters in register 18 are arranged in their original sequence in preparation for a next compare operation with a new address.

After the sensing of $\alpha_2\alpha_1$ in the register 14–1 and 14–2, each time a character is matched, a shift signal is gated through AND 100, and OR 103 and applied to register 18 via line 104 and OR 105 to shift the contents of register 18 one position to the left. The output of OR 103 also is applied, through a line 118, to advance the counter 117. Thus the counter 117 holds a count of the number of successively matched characters. This count is one less than the count in counter 38. In the event of a mismatch, it is necessary to shift the contents of register 18 until the first matched character is again in register 18–1, before attempting to match the register contents with a next table address. When a mis-match is detected, output of OR 103, in response to the mismatch output of OR 116, advances the counter 117 to include a count for the mismatched character.

The output of an AND gate 120 on a line 122 is 0 volt when the count in counter 117 is other than 0. This output is inverted by an inverter 124 and appears as a −3.5 volt gating potential at one input terminal of an AND gate 126. When the counter 117 advances to a count of 0, the output of AND 120 changes to −3.5 volts which is inverted by inverter 124 and appears at AND 126 as a 0 volt blocking signal.

The mismatch output of OR 116 is also applied to a delay unit 128 from which, after a delay to let the counter and AND 120 change, is applied as a second input to AND 126. As long as the counter 117 stands at other than 0 the delayed output from 128 is gated through AND 126 to OR 116 to initiate another shifting of characters in register 18, another count into counter 117, and another delayed output from 128. Thus it is apparent that the shifting in register 18 will continue until the characters therein are in the proper sequence at which time the counter 117 has changed from a count of 15 to a count of 0 and the delayed output from delay 128 is blocked by the 0 count in counter 117.

For example, if the first three characters, $A_1A_2A_3$, in the register 18 match three successive characters $A_1A_2A_3$, in the table 10, following the detection of $\alpha_1\alpha_2$ the count in counter 117 is three when the mismatch of the fourth character is detected. The mismatch signal, through OR 116 and OR 103, advances the counter to four and it is then necessary to effect twelve more shift operations to advance the first character to the compare position 18–1. At the end of the twelfth shift operation, the counter 117 has advanced to a count of 0 and the delayed signal from delay 128 is blocked to stop the ring operation.

This shifting of characters in the register 18 is also necessary when a complete address has been matched and the associated data are read out. Assuming that character $A_1$–$A_4$ of a group of characters $A_1$–$A_{16}$ in the register 18 have been matched, the characters at the end of the match, are arranged in the register 18 from left to right as follows: $A_5A_6A_7 \ldots A_{15}A_{16}A_1A_2A_3A_4$.

When the character $\tau$ following $A_1A_2A_3A_4$ in the table data is detected, it is matched against a character, for example $A_5$, in the register 18 and the mismatch signal to OR 116 initiates the circulating operation described above for a mismatch operation.

*Shift control operation*

Referring to FIGURE 2*c*, the table entry format shown on line 1 includes the symbols $n\delta$ which, in practice, is some number plus the symbol $\delta$. In the normal operation, when the address $A_1A_2A_3A_4$ has been matched by input data in register 18, consisting of a corresponding word $A_1A_2A_3A_4$, the symbol $\tau$ is detected and the data $F_1F_2F_3F_4F_5$ associated with the address $A_1A_2A_3A_4$ is to be read out. After readout, the normal operation is to shift the input word $A_1A_2A_3A_4$ out of the register 18 and to shift in four characters of new data $A_{17}A_{18}A_{19}A_{20}$. However, it is sometimes desired to retain portions of the matched data for reuse. To effect this retention, the instruction $n\delta$ is inserted in the table data.

In the described example, where a four character address $A_1A_2A_3A_4$ is matched, the count of five appears in the counter 38. Prior to shifting new data into the register 18, the data which is, at the end of the matching, in the order $A_5A_6A_7 \ldots A_{16}A_1A_2A_3A_4$ will have been circulated by the counter 117 and the associated circuits in the manner described hereinbefore and placed in the proper sequence $A_1A_2 \ldots A_{16}$.

With the count of five in the counter 38, the output on lines 72 and 73 is 0 volt. The 0 volt potential on the line 72 is inverted by an inverter 130 and is applied as one of two inputs to an AND gate 132. The output of AND 132 is the binary 1 input to input reader trigger 134. The other input to AND 132 is the previously described output from AND 44.

With the counter 38 standing at a count other than 1, and with the read out trigger 106 ON, as it is at the end of a read out operation, and with the characters $\alpha_1\alpha_2$ in the register 14 following the read out of associated data, the output of AND 132 turns input reader trigger 134 ON. It is noted that the output of AND 44 also is applied to the binary 0 inputs of read out trigger 106 and space match trigger 109. The turning OFF of read out trigger 106 also inhibits AND 44 but not until after AND 132 has turned input reader trigger 134 ON. The binary 1 output of trigger 134 is applied through lines 135, 136 to the input reader 12 to initiate reading of new data. The binary 1 output of trigger 134 also is applied via lines 135, 138 to an AND gate 140 which is in the binary 0 input circuit of the trigger 134. The input reader 12 then reads one character which is gated into the register 18–16 by the input reader clock pulse via lines 146, 147 and OR 105. This clock pulse also effects a shifting to the left of all other data in the register 18. The end around shift from register 18–1 to 18–16 is blocked at this time by an AND gate 142 due to the absence of a gating signal on a line 144 from the binary 0 output of the trigger 134, and the character in register 18–1 is shifted out and lost.

As specified hereinbefore, the input reader 12 produces the clock pulse on the line 146 each time a character is read therein. This clock pulse is different from the clock pulse K. The input reader clock pulse also is applied as a second input to AND 140. The line 73 from AND 69 at counter 38 is the third input to AND 140. The 0 volt potential on line 73 blocks AND 140 until the counter 38 stands at a count of 2. Then, the next following clock pulse on line 146 turns trigger 134 OFF. The counter 38 receives the clock pulses from line 146 via a line 148. These pulses operate to count the counter 38 down 1 step for each character read in reader 12, from a count of 5, in the given example, to 4 to 3 to 2 and finally to 1. When the counter reaches a count of 2, after the third character in the given example is read into register 18, the output of AND 69 changes from 0 volt to −3.5 volts which conditions AND 140 to gate the next clock pulse on line 146, generated when the fourth character is read in reader 12, through AND 140 to the binary 0 input of trigger 134, thereby turning the trigger 134 OFF.

The binary 0 output of trigger 134 applied through line 144 gates AND 142 enabling register 18 for the end around shifting of characters. The binary 0 output of trigger 134 also is applied via a line 150 to an AND gate 151. The binary 0 output of the read out trigger 106 is the second input to AND 151. The output of AND 151 on a line 152 comprises a third input to AND 35. The read out trigger 106 is ON during read out and the input reader trigger 134 is ON while new data are being shifted into register 18. Thus, it is apparent that the characters $\alpha_1\alpha_2$ shifting through the register 14, during a read out operation or a read in operation, cannot affect the counter 38 or the compare delay trigger 36.

The clock pulse which turned the input reader trigger 134 OFF also counted counter 38 to 1. This one count is manifested on the line 72 by a −3.5 volt potential which is inverted and appears as a blocking 0 volt potential on the input line to AND 132.

The foregoing is the normal operation of the circuit. However, if it is desired to shift out a number of characters different from the number of characters matched in the preceding operation, the character $n$ appears in the register 14–2 and the character $\delta$ appears at the same time in register 14–1. The number $n$ is to be entered in the counter 38. Since the counter 38 contains a count one greater than the number of matched characters, it is necessary that the number $n$ substituted therein be one greater than the number of characters it is desired to shift out.

In the given example, a four character address was matched and a count of 5 stood in the counter 38. If it is now desired to shift only two new characters into the register 18 instead of the normal 4, the number $n$ in the table is 3, which is one greater than the desired number of shifts.

As previously described, the character $\delta$ in register 14–1 produces a —3.5 volt input to OR 110 via line 111–1 which also is applied through a line 153 to five AND gates represented by a single block 154. A second input to each of these five AND gates is the binary 1 output of read out trigger 106 via lines 114, 155. A third input to each of the five AND gates 154 is the clock pulse K. The fourth input to each of the AND gates consists of one of the lines 156–0 through 156–4 corresponding to the five low order bits of a character (in this instance the number 3) in register 14–2. The lines 156–0, 156–1, 156–2, 156–3 and 156–4 are connected to corresponding lines 23–0, 23–1, 23–2, 23–3 and 23–4. Signals on the lines 156, in accordance with the binary code for the particular number $n$, are gated through the AND gates 154 by the signals on lines 153 and 155 and by the clock pulse K. The binary coded outputs on the five lines represented by the cable 158 are applied in parallel to the binary inputs of the counter 38 to enter the number $n$ in this counter in place of the number already there. It is apparent that this substitution of the number $n$ will occur immediately after sensing of the character $\tau$ and prior to the shifting of data in the register 18.

The operation with the number $n$ in counter 38 is precisely the same as the normal operation described hereinbefore except that the number of characters shifted from the input reader 12 to input register 18 is in accordance with the number $n$ rather than with the number previously stored in counter 38.

*Automatic space operation*

As previously indicated, it is desired, when a match has been made between an input word in register 18 and an address in register 14, to continue the match through the high order five bit positions of the character $\tau$ to obtain a match on a space symbol (#) if this symbol immediately follows the last character of a matched address. If the match between $\tau$ and # is indicated by a —3.5 volt signal on line 31, the read out of associated data is extended to read out the character $\alpha_1$ following the last character, $F_5$ in the example, of the associated data. It is noted that the binary coding of $\alpha_1$ (0111111) is the same as the coding of # (011111). Normally the read out is terminated after $F_5$ is read out, but this space match operation provides for reading out of the symbol $\alpha_1$ which is interpreted by the output unit 32 as a space.

Having obtained a match on the address, the character $\tau$ is shifted into register 14–2, at which time it is assumed the space symbol # has been shifted in the register 18–1, whereby the two are compared in the comparator. Referring to FIG. 3, it is noted that AND gate 30 produces a —3.5 volt output on line 31 when the five high order bits of the two characters match.

The output on line 31 is applied to AND 108 through which it is gated by the output of AND 78 on line 79–2 to turn the space match trigger 109 ON. The output of AND 78 is applied through a line 158, delay unit 160, line 162 and OR 67 to advance the counter 38 to a count of 6 whereby the symbol # will be shifted out of the input register 18 when new data are shifted in. As noted before, the binary 1 output of trigger 109 is applied to OR 52, the output of which is applied as one input to AND 54. The binary 1 output of trigger 106 and the not $\delta$ (absence of $\delta$ in register 14) output of inverter 112 gate the binary 1 output of space match trigger 109 through AND 54 and the line 55 to gate the character $\alpha_1$ from the register 14–2 through the gates 56–0 to 56–5 to the output device 32.

Normally, the read out of the symbol $\alpha_1$ is inhibited by the presence of $\alpha_1\alpha_2$ in registers 14–2 and 14–1 respectively. With $\alpha_1\alpha_2$ in registers 14–2 and 14–1, the resultant —3.5 volt signal on line 46 is inverted by inverter 50 and is applied to OR 52 as a 0 volt potential which is blocked. Therefore this normal read out circuit may not be utilized in the automatic space operation. However, an alternate input to OR 52 is provided by the binary 1 output of the space match trigger 109 whereby the character $\alpha_1$ is read out and is interpreted in the output unit as a space. The $\alpha_1\alpha_2$ output on lines 34 and 42 does operate in conjunction with the next following clock pulse K, generated while $\alpha_1$ is being shifted out of register 14–2, to turn the read out trigger 106 and the space match trigger 109 OFF, however, the character $\alpha_1$ has already been read out to the output unit 32 at this time.

After new data are shifted into register 18 and the input reader trigger 134 is turned OFF, or after a mismatch indication and recirculation of data in the register 18, the next $\alpha_1\alpha_2$ symbols passing through register 14 initiate a new compare operation.

While the invention has been particularly shown and described with reference to a preferred embodiment thereof, it will be understood by those skilled in the art that various changes in form and details may be made therein without departing from the spirit and scope of the invention.

What is claimed is:

1. Data processing apparatus comprising, in combination, a first data source storing data characters including a universal character, means operable for reading said characters, a second data source storing data characters, means operable for reading last said characters, means for comparing characters from said first source with characters from said second source, means for deriving a mismatch indicating signal when two compared characters do not match, means for deriving a match indicating signal when a predetermined group of consecutive characters from said second source match a corresponding group of consecutive characters from said first source, means operative to recognize said universal character, and means operable by said recognizing means to inhibit the derivation of said mismatch indicating signal.

2. Data processing apparatus comprising, in combination, a first data source storing data characters including a universal character, means operable for reading said characters, a second data source storing data characters, means operable for reading last said characters, means for comparing characters from said first source with characters from said second source, means for deriving a mismatch indicating signal when two compared characters do not match, means operative to recognize said universal character, means operable by said recognizing means to inhibit the derivation of said mismatch indicating signal, and means for deriving a match indicating signal when a predetermined group of consecutive characters from one said source match a corresponding group of consecutive characters from the other said source.

3. Data processing apparatus comprising, in combination, a first data source storing data characters including a universal character, means operable for reading said characters, a second data source storing data characters, means operable for reading last said characters, means for comparing characters from said first source with characters from said second source, means for deriving a mismatch indicating signal when two compared characters do not match, means for deriving a match indicating signal when a predetermined group of consecutive characters from one said source match a corresponding group of consecutive characters from the other said source, said group consisting of at least one character, means operative to recognize said universal character, and means operable by said recognizing means to inhibit the derivation of said mismatch indicating signal.

4. Data processing apparatus comprising, in combination, a first data source storing data characters including a universal character, means operable for serially reading said characters, a second data source storing data characters, means operable for serially reading last said characters; means for comparing characters from first said source with characters from said second source, means deriving a mismatching indicating signal when two compared characters do not match, means for deriving a match indicating signal when a predetermined group of consecutive characters from one said source match a corresponding group of consecutive characters from the other said source, means operative to recognize said universal character, and means operable by said recognizing means to inhibit the derivation of said mismatch indicating signal.

5. Data processing apparatus comprising, in combination, a first data source storing data characters including a universal character, a register to receive said characters serially from said first source, means to shift said characters serially through said register, a second data source storing data characters, a second register to receive said characters serially from said second data source, means to shift said characters from said second source to said second register, means for comparing a character in first said register with a character in second said register, means for deriving a mismatch indicating signal when two compared characters do not match, means for deriving a match indicating signal when a predetermined group of consecutive characters from one said source match a corresponding group of consecutive characters from the other said source, means associated with first said register to recognize said universal character in said register, and means operable by said recognizing means for inhibiting said mismatch indicating signal.

6. Data processing apparatus comprising, in combination, first means storing words comprising data characters including a universal character, means operable for reading said words character-by-character, second means storing words comprising data characters, means for reading last said words character-by-character from said second means, means for comparing words from one said source character-by-character with words from the other said source, means for deriving a mismatch indicating signal when two compared characters do not match, means for deriving a match indicating signal when a word from one said source matches a word from the other said source, means for recognizing said universal character, and means operable by said responsive means to inhibit the derivation of said mismatch indicating signal.

7. Data processing apparatus comprising, in combination, a first data source storing data characters including a universal character, means operable for reading said characters, a second data source storing data characters, means operable for reading last said characters, means for comparing characters from said first source with characters from said second source, means for deriving a mismatch indicating signal when two compared characters do not match, means operative to recognize said universal character, means operable by said recognizing means to inhibit the derivation of said mismatch indicating signal and means for deriving a match indicating signal when said mismatch indicating signal is not derived during comparison of a predetermined group of consecutive characters from one said source with a group of consecutive characters from the other said source.

8. Data processing apparatus comprising, in combination, a first source storing data characters including a universal character, a register to receive said characters serially from said first source, means to shift said characters serially through said register, a second data source storing data characters, a second register to receive said characters serially from said second data source, means to shift said characters from said second source to said second register, means for comparing a character in first said register with a character in second said register, means for deriving a mismatch indicating signal when two compared characters do not match, means associated with first said register to recognize said universal character in said register, means operable by said recognizing means for inhibiting said mismatch indicating signal, and means for deriving a match indicating signal when said mismatch indicating signal is not derived during comparison of a predetermined group of consecutive characters from one said source with a corresponding group of consecutive characters from the other said source.

9. Data processing apparatus comprising, in combination, first means storing words comprising data characters including a universal character, means operable for reading said words character-by-character, second means storing words comprising data characters, means for reading last said words character-by-character from said second means, means for comparing words from one said source character-by-character with words from the other said source, means for deriving a mismatch indicating signal when two compared characters do not match, means for recognizing said universal character, and means operable by said responsive means to inhibit the derivation of said mismatch indicating signal, and means for deriving a match indicating signal when said mismatch indicating signal is not derived during comparison of a word from one said source with a word from the other said source.

References Cited in the file of this patent

UNITED STATES PATENTS

| | | |
|---|---|---|
| 2,648,829 | Ayres et al. | Aug. 11, 1953 |
| 2,845,220 | Bensky et al. | July 29, 1958 |
| 2,854,652 | Smith | Sept. 30, 1958 |
| 2,865,567 | Booth et al. | Dec. 23, 1958 |
| 2,871,289 | Cox et al. | Jan. 27, 1959 |
| 2,926,337 | Rivas | Feb. 23, 1960 |
| 3,007,137 | Page et al. | Oct. 31, 1961 |

OTHER REFERENCES

IBM Reference Manual, Ramac 305, pp. 28–30 relied upon.